US009447541B2

(12) United States Patent
Heiskanen et al.

(10) Patent No.: US 9,447,541 B2
(45) Date of Patent: *Sep. 20, 2016

(54) PROCESS FOR TREATING CELLULOSE AND CELLULOSE TREATED ACCORDING TO THE PROCESS

(75) Inventors: Isto Heiskanen, Imatra (FI); Kaj Backfolk, Lappeenranta (FI); Ari Kotilainen, Joensuu (FI); Valentas Gaidelis, Vilnius (LT); Jonas Sidaravicius, Vilnius (LT)

(73) Assignee: Stora Enso OYJ, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/116,590

(22) PCT Filed: May 11, 2012

(86) PCT No.: PCT/IB2012/052353
§ 371 (c)(1),
(2), (4) Date: Nov. 8, 2013

(87) PCT Pub. No.: WO2012/156882
PCT Pub. Date: Nov. 22, 2012

(65) Prior Publication Data
US 2014/0073774 A1    Mar. 13, 2014

(30) Foreign Application Priority Data
May 13, 2011   (SE) .................... 1150436-2

(51) Int. Cl.
| B01D 61/56 | (2006.01) |
| D21C 9/18  | (2006.01) |
| C02F 11/00 | (2006.01) |
| D21C 9/00  | (2006.01) |
| D21H 11/18 | (2006.01) |
| C02F 1/469 | (2006.01) |
| C02F 11/12 | (2006.01) |

(52) U.S. Cl.
CPC ............ *D21C 9/18* (2013.01); *B01D 61/56* (2013.01); *C02F 11/006* (2013.01); *D21C 9/001* (2013.01); *D21C 9/007* (2013.01); *D21H 11/18* (2013.01); *C02F 1/4698* (2013.01); *C02F 11/12* (2013.01)

(58) Field of Classification Search
CPC .... B01D 61/56; C02F 1/4698; C02F 11/006; C02F 11/12; D21H 11/18; D21C 9/001; D21C 9/007; D21C 9/18
USPC ............................................ 536/56; 204/553
See application file for complete search history.

(56) References Cited

U.S. PATENT DOCUMENTS

| 3,382,140 A | 5/1968 | Henderson et al. |
| 3,705,847 A | 12/1972 | Stiles |
| 3,757,426 A * | 9/1973 | Candor et al. ................ 34/251 |
| 4,101,400 A | 7/1978 | Pepping |
| 4,341,807 A | 7/1982 | Turbak et al. |
| 4,427,778 A | 1/1984 | Zabriskie |
| 4,481,076 A | 11/1984 | Herrick |
| 4,483,743 A | 11/1984 | Turbak et al. |
| 4,634,470 A | 1/1987 | Kamide et al. |
| 4,645,541 A | 2/1987 | DeLong |
| 4,728,367 A | 3/1988 | Huber et al. |
| 5,129,987 A | 7/1992 | Joachimides et al. |
| 5,221,821 A | 6/1993 | Burns et al. |
| 5,731,080 A | 3/1998 | Cousin et al. |
| 5,964,983 A | 10/1999 | Dinand et al. |
| 6,037,380 A | 3/2000 | Venables et al. |
| 6,228,213 B1 | 5/2001 | Hanna et al. |
| 6,425,975 B1 | 7/2002 | Viikari et al. |
| 6,871,744 B2 | 3/2005 | Miller et al. |
| 7,297,224 B2 | 11/2007 | Nakamura et al. |
| 8,133,355 B2 | 3/2012 | Pulliainen et al. |
| 2001/0011516 A1 | 8/2001 | Cantiani et al. |
| 2005/0000666 A1 | 1/2005 | Taylor et al. |
| 2005/0199499 A1 | 9/2005 | Berrak et al. |
| 2005/0274469 A1 | 12/2005 | Lundberg et al. |
| 2006/0020126 A1 | 1/2006 | Kopesky et al. |
| 2006/0289132 A1 | 12/2006 | Heijnesson-Hulten |

(Continued)

FOREIGN PATENT DOCUMENTS

| CA | 1208631 A | 7/1986 |
| CN | 1437502 | 8/2003 |

(Continued)

OTHER PUBLICATIONS

International Search Report, Jul. 5, 2012, World Intellectual Property Office, PCT/IB2012/052353.

Kilchherr, R. "Transport Processes During Electrowashing of Filter Cakes." Chemical Engeering Science. 2004, vol. 59, No. 5, pp. 1103-1114.

Written Opinion of the Isa issued in PCT/IB2012/052353, date Jul. 5, 2012.

(Continued)

*Primary Examiner* — Ganapathy Krishnan
(74) *Attorney, Agent, or Firm* — Greer, Burns & Crain, Ltd.

(57) ABSTRACT

The present invention relates to a process for purifying a slurry comprising cellulose, such as microfibrillated cellulose, wherein the process comprises the following steps: —providing a slurry comprising cellulose and liquid, —subjecting the slurry to an electric field inducing the liquid of the slurry to flow, —separating the liquid from the cellulose thus obtaining a liquid depleted slurry, —adding a washing liquid, such as an organic solvent, to the liquid depleted slurry—subjecting the liquid depleted slurry to an electric field inducing the washing liquid of the slurry to flow and—separating the washing liquid from the cellulose, thus obtaining a purified cellulose. The invention also relates to cellulose such as microfibrillated cellulose obtainable from said process.

15 Claims, 4 Drawing Sheets

(56) References Cited

U.S. PATENT DOCUMENTS

Figure 1:
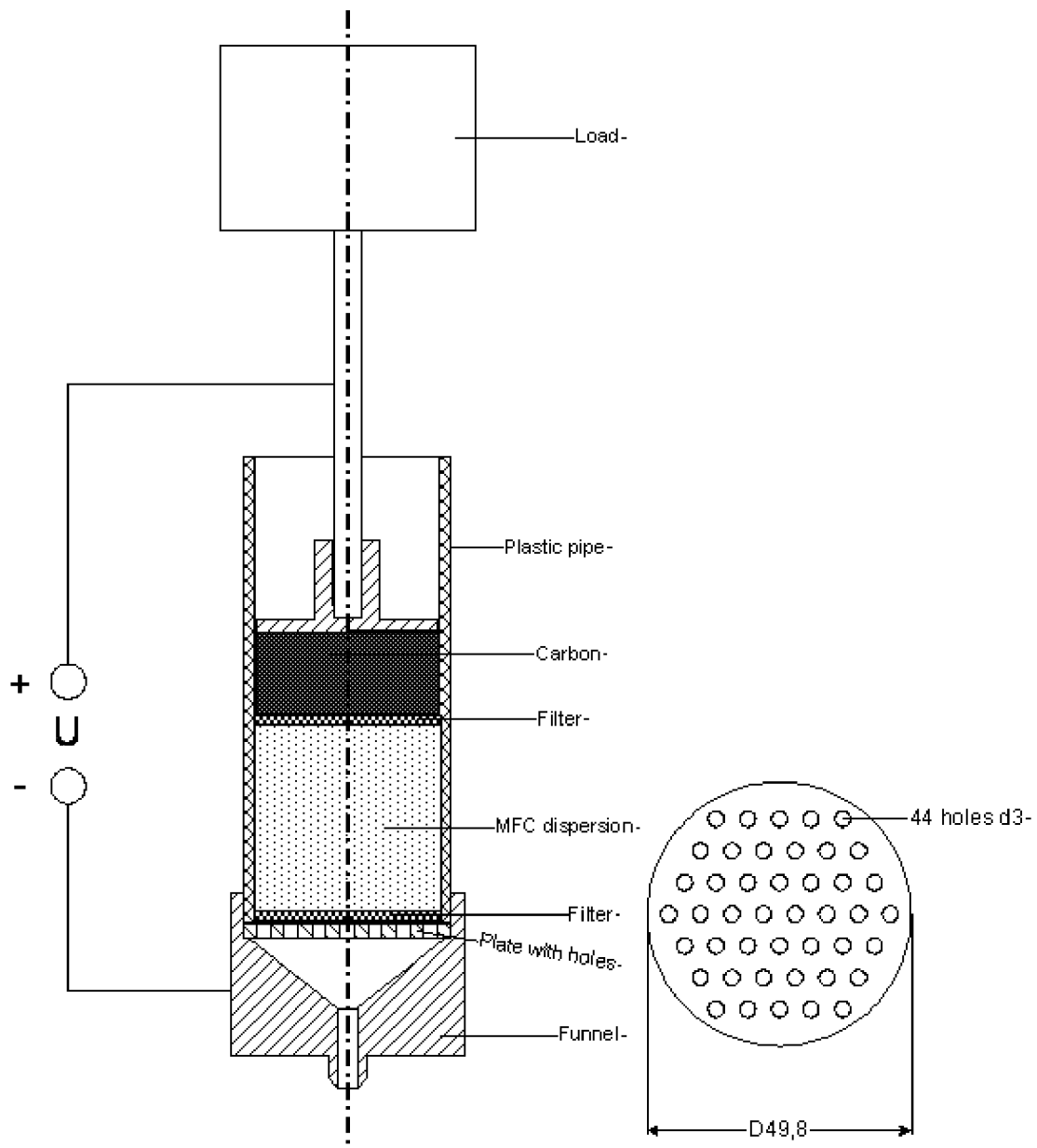

| | | |
|---|---|---|
| 2007/0151683 A1 | 7/2007 | Pere et al. |
| 2008/0057307 A1 | 3/2008 | Koslow et al. |
| 2009/0061484 A1 | 3/2009 | Scott et al. |
| 2010/0151527 A1 | 6/2010 | Endo et al. |
| 2012/0135506 A1 | 5/2012 | Heiskanen et al. |

FOREIGN PATENT DOCUMENTS

| | | | |
|---|---|---|---|
| EP | 1036799 | 9/2000 | |
| EP | 2196579 | 6/2010 | |
| EP | 2196579 A1 * | 6/2010 | ............... D21C 5/00 |
| EP | 2196579 A1 | 6/2010 | |
| JP | S59-145005 | 8/1984 | |
| JP | H09-296400 | 11/1997 | |
| JP | 2000096498 | 4/2000 | |
| JP | 2002138383 | 5/2002 | |
| JP | 2004300591 | 10/2004 | |
| JP | 2007507338 | 3/2007 | |
| JP | 2008075214 | 4/2008 | |
| JP | 2009293167 | 12/2009 | |
| JP | 2010168716 | 8/2010 | |
| JP | 2011522902 | 8/2011 | |
| WO | 9318111 | 9/1993 | |
| WO | 9611051 A2 | 4/1996 | |
| WO | 0185305 | 11/2001 | |
| WO | 0196402 | 12/2001 | |
| WO | 03033815 | 4/2003 | |
| WO | 2004055267 | 7/2004 | |
| WO | 2004055268 | 7/2004 | |
| WO | 2005033024 | 4/2005 | |
| WO | 2005033024 A1 | 4/2005 | |
| WO | WO 2005/033024 A1 * | 4/2005 | ............... C02F 11/12 |
| WO | 2007091942 | 8/2007 | |
| WO | 2008033283 | 3/2008 | |
| WO | 2008123419 | 10/2008 | |
| WO | WO 2009/126106 A1 * | 10/2009 | ............... D21H 11/20 |
| WO | 2010015726 | 2/2010 | |
| WO | 2010131016 A2 | 11/2010 | |
| WO | 2011051882 | 5/2011 | |

OTHER PUBLICATIONS

Lucache, Dorin Dumitru et al., "Electro-Osmosis in Dewatering of Pulp and Paper Waste Sludge," Annals of the University of Craiova, Electrical Engineering Series, No. 32, 2008, ISSN 1842-4805.

Vehvilainen et al., "Effect of wet spinning parameters on the properties of novel cellulosic fibres," Cellulose (2008), 15:671-680.

Paakko et al, "Enzymatic Hydrolysis Combined with Mechanical Shearing and High-Pressure Homogenization for Nanoscale Cellulose Fibrils and Strong Gels," Biomacromolecules 2007, 8, 1937-1941.

Svagan et al., "Biomimetic Foams of High Mechanical Performance Based on Nanostructured Cell Walls Reinforced by Native Cellulose Nanofibrils," Adv, Mater, 2008, 20, 1263-1269.

Zhou et al., "Review of Microfibrillated Cellulose (MFC) for Papermaking," 2007, Pulp and Paper Engineering, School of Chemical and Biomolecular Engineering Georgia Institute of Technology, http://www.tappi.org/Downloads/Conference-Papers/2007/07NAN/07NAN18.aspx.

Cellulase Analytical Method, 2011, Enzyme Development Corp., http://www.enzymedevelopment.com/wp-content/uploads/2011/10/Cellulase-ECU-UNCO.pdf.

Smook, Gary A., Handbook for Pulp and Paper Terminology, 190, Angus Wilde Publications, Inc., p. 129.

Kilchherr, R. "Transport Processes During Electrowashing of Filter Cakes," Chemical Engineering Science, 2004, vol. 59, No. 5, p. 1103-1114, ISSN 0009-2509.

Saito, et al., "Cellulose Nanofibers Prepared by TEMPO-Mediated Oxidation of Native Cellulose," Biomacromolecules, 2007, vol. 8, pp. 2485-2491, abstract.

Ankerfors, "Microfibrillated Cellulose: Energy-Efficient Preparation Techniques and Key Properties," Licentiate Thesis 2012.

Ankerfors et al., "On the Manufacture and Use of Nanocellulose," 9th International Conference on Wood and Biofiber Plastic Composites, 2007.

Siro et al., "Microfibrillated Cellulose and New Nanocomposite Materials: A Review," Cellulose (2010) 17: 459-494.

Ahola, "Properties and Interfacial Behavior of Cellulose Nanofibrils," Doctoral Thesis, TKK Reports in Forest Products Technology, Series A4, Espoo 2008.

Henriksson, M. et al., "Cellulose Nanopaper Structure of High Toughness," Biomacromolecules, May 23, 2008, vol. 9, pp. 1579-1585, p. 1580, "Preparation of MFC."

Lee, S-H, et al., "Enzymatic Saccharification of Woody Biomass Micro/Nanofibrillated by Continuous Extrusion Process I—Effect of Additives with Cellulose Affinity." Bioresource Technology 2008, Jul. 15, vol. 100, No. 1, pp. 275-279, p. 1, abstract.

Patent Office of the People's Republic of China, First Office Action, Chinese Application No. 201280023829.2, Dec. 23, 2014.

Institutionen for Pappersteknik KTH, "Pappersteknik," 1992, second edition, ISBN 91-7170076-5, pp. 446-447.

Chinese Patent Office, Office Action, CN201280023765.6, Oct. 10, 2015.

Patent Examination Report No. 1 issued by the Australian Patent Office on Apr. 27, 2016.

Patent Examination Report No. 1 issued by the New Zealand Patent Office on Apr. 5, 2016.

Office Action issued by the Japanese Patent Office, for Application No. 2014-509881, on Jun. 2, 2016.

Office Action issued by the Russian Federal Institute of Industrial Property for Application No. 2013155201/12 (086069), on May 18, 2016.

\* cited by examiner

PROCESS FOR TREATING CELLULOSE AND CELLULOSE TREATED ACCORDING TO THE PROCESS

This application is a U.S. National Phase under 35 U.S.C. §371 of International Application No. PCT/IB2012/052353, filed May 11, 2012, which claims priority under 35 U.S.C. §§119 and 365 to Swedish Application No. 1150436-2, filed May 13, 2011.

FIELD OF INVENTION

The present invention relates to a process for purifying, such as salt/ion depletion and/or free sugar depletion, preferably by using dewatering, a slurry comprising cellulose, such as microfibrillated cellulose, by subjecting the slurry to an electric field.

BACKGROUND

Microfibrillated cellulose (MFC), which also is known as nanocellulose, is a material typically made from wood cellulose fibers. It can also be made from microbial sources, agricultural fibers, dissolved cellulose or CMC etc. In microfibrillated cellulose the individual microfibrils have been partly or totally detached from each other.

Microfibrillated cellulose has a very high water binding capacity and it is thus very difficult to reduce the water content of a slurry comprising microfibrillated cellulose and accordingly it is thus difficult to purify. High water content of a slurry comprising microfibrillated cellulose also prevents usage of MFC in many different application where MFC with high solids would be required.

Today there exist several different methods to remove water from a slurry comprising cellulose, such as microfibrillated cellulose. It is for example possible to use different drying techniques. Examples of different drying techniques are; freeze drying, spray drying and supercritical drying. These techniques are however quite energy demanding and thus not so cost efficient to use in large scale processes. Also, hornification, or superhornification, of the microfibrillated cellulose fibers often tends to occur when water is removed with different drying techniques. Hornification is when irreversible bonds between the fibers are formed. When hornification has occurred it is not possible for the fibers to expand and swell in water and the original water bonding capacity of the fibers is thus lost. The hornification may be prevented by addition of chemicals which physically prevent or modify the fibers in such way that the formation of bonds between cellulose fibers are limited or prevented. CA1208631A describes a process to re-disperse dried microfibrillated cellulose by addition of additives that will prevent the fibrils from bonding to each other and thus also prevents hornification of the fibers.

Further there is disclosed by Luchache et al. in Annals of the University of Craiova, Electric Engineering series, No. 32, 2008; ISSN 1842-4805 dewatering of pulp and paper waste sludge.

Mechanical treatments in order to remove water from a slurry comprising cellulose, such as microfibrillated cellulose can also be used. However, they are normally not very successful due to the small fiber size and size distribution of the microfibrillated cellulose. Moreover, filtration of a slurry comprising cellulose, such as microfibrillated cellulose is difficult due to the dense web formed by the slurry. Furthermore, the bonds between the microfibrillated cellulose fibers are also quite strong and this will also make mechanical dewatering less efficient.

The inefficiency or limitations in drying in e.g. pressurized dewatering will further give problems with the removal of ions of cellulose constituents. Since a filter cake is formed during dewatering, a higher resistance to dewatering is obtained. At the same time, it is more difficult to remove e.g. ions or other dissolved species since these might be accumulated in the filter cake. Therefore, the obtained dewatered filter cake of MFC might in fact contain the initial amount of ions or even substantial higher amount of ions.

When using a normal drying method, the ions and residual chemicals will remain in the concentrated fiber suspensions and finally in the dried MFC or cellulose sample.

There is thus a need for an improved process for purifying, such as salt/ion depletion and/or free sugar depletion, of a slurry comprising cellulose, such as microfibrillated cellulose without causing hornification, or superhornification.

SUMMARY OF INVENTION

The present invention solves one or more of the above problems, by providing according to a first aspect a process for purifying such as salt/ion depletion and/or free sugar depletion, preferably using dewatering, of a slurry comprising cellulose, such as microfibrillated cellulose wherein the process comprises the following steps:
    providing a slurry comprising cellulose and liquid,
    subjecting the slurry to an electric field inducing the liquid of the slurry to flow,
    separating the liquid from the cellulose thus obtaining a liquid depleted slurry,
    adding a washing liquid, such as an organic solvent, to the liquid depleted slurry
    subjecting the liquid depleted slurry to an electric field inducing the washing liquid of the slurry to flow and
    separating the washing liquid from the cellulose, thus obtaining a purified cellulose.

The present invention also provides according to a second aspect cellulose, such as microfibrillated cellulose, purified according to the first aspect.

The present invention also provides according to a third aspect, cellulose, such as microfibrillated cellulose, obtainable by the process according to the first aspect.

The present invention also provides according to a fourth aspect use of the cellulose, such as microfibrillated cellulose, according to the second or the third aspect in a strength additive, a thickener, a viscosity modifier, a rheology modifier, a cleaning powder, a washing powder, a detergent, a foam composition, a barrier, a film, a food product, a pharmaceutical composition, a cosmetic product, a paper or board product, a coating, a hygiene/absorbent product, an emulsion/dispersing agent, a drilling mud, a composite material, in water purification, in a filter, in a solar cell, in a battery, in an electronic circuit (which may be flexible, printed or coated), or to enhance the reactivity of cellulose in the manufacture of regenerated cellulose or cellulose derivatives.

The object of the present invention is thus to provide a process for purifying, such as salt/ion depletion and/or free sugar depletion, preferably by using the dewatering, a slurry comprising cellulose, such as microfibrillated cellulose, in an improved way.

Another object of the present invention is to provide dewatered cellulose, such as microfibrillated cellulose with improved properties.

These object, as well as other objects and advantages, is achieved by the process according to the first aspect which also is reflected in claim 1. It has been shown that the use of an electric field will strongly improve purifying such as salt/ion depletion and/or free sugar (carbohydrate) depletion, preferably by using dewatering, of a slurry comprising cellulose, such as microfibrillated cellulose.

The purifying, such as salt/ion depletion and/or free sugar depletion, may preferably be done using dewatering by using electro-osmosis (or capillary electrophoresis). This dewatering may also additionally also involve stimulation of other external sources such as mechanical or optical or magnetic field. One example is an ultrasound treatment. The purifying, may also be followed by any one or a combination thereof of the below methods to further dry the material:
1) Drying methods by evaporation
2) Freeze drying because of increased solids
3) Adding de-hornification additives can also be used in drying of dewatered material
4) dewatered material may also partially be dried further to obtain material which behaves like solid particles and thus more easily used in commercial applications while still easily mixed and dispersed to other components (individual fibers are essentially maintained) or easily used as such.

It is preferred that an electric field with a voltage of 10-100 V is used. Increasing the voltage typically increases the water extraction rate. The optimal value is when the current intensity of the generated electric field and the voltage gradient are at maximum allowable levels.

Pressure and/or heat may also be applied to the slurry in order to further improve the purifying, such as salt/ion depletion and/or free sugar depletion, of the slurry, preferably when using dewatering. The pressure may be applied after the electric field has been applied and the dewatering of the slurry has been started. This is due to that it may be preferred to increase the dry content of the slurry before pressure is applied. Another possibility is to have weak dewatering in E-field simultaneously as mechanical pressure is applied. However, it depends of course on the dry content of the slurry being treated.

The pressure applied is preferably a mechanical pressure, such as compression by the use of for example a roll nip or felts.

The dry content of the slurry comprising cellulose, such as microfibrillated cellulose, before purifying, such as salt/ion depletion and/or free sugar depletion, preferably by using dewatering is preferably about 1-10% by weight. After the treatment according to the process it is preferred that the dry content of the purified, such as salt/ion depleted and/or free sugar depleted, preferably by using dewatering, slurry comprising cellulose, such as microfibrillated cellulose, is about 5-50% by weight.

The temperature of the slurry during purifying, preferably involving dewatering, is preferably above 30° C. and preferably below 100° C.

The slurry may also comprise nanoparticles (such as absorbents), salt and/or surfactants which are stimulated by the electric field and improves the liquid flow. In this way the purifying, salt/ion depletion and/or free sugar depletion, preferably involving dewatering, of the slurry is increased. Further, aromas may be depleted.

The present invention also relates to cellulose, such as microfibrillated cellulose, being purified, such as salt/ion depleted and/or free sugar depleted, preferably by using dewatering according to the process described above. It has been shown that by purifying, such as salt/ion depletion and/or free sugar depletion, preferably by using dewatering, a slurry comprising cellulose, such as microfibrillated cellulose by the aid of an electric field no or very limited hornification of the microfibrillated cellulosic fibers will occur.

DETAILED DESCRIPTION OF THE INVENTION

The present invention relates to a process for purifying, such as salt/ion depletion and/or free sugar depletion, preferably by using dewatering a slurry comprising cellulose, such as microfibrillated cellulose. Due to the characteristics of microfibrillated cellulose fibers, e.g. its size, size distribution and fiber bonds, it is normally very difficult to purify, such as salt/ion deplete and/or free sugar deplete, a slurry comprising microfibrillated cellulose by using dewatering.

It is intended throughout the present description that the expression "cellulose" embraces any type of cellulose, such as cellulose fibres (cellulose material). The cellulose may also be a microfibrillated cellulose (MFC). The cellulose may be bleached or unbleached. The cellulose may also be crystalline cellulose, MCC (microcrystallinic cellulose; has high purity need due to its potential use in pharmaceutical compositions or other medical uses), BNC, NCC (nanocrystallinic cellulose; may be used in electrical applications and has magnetical properties), CNC, CMC (carboxymethylated cellulose) or synthetic polymer fibers and fibers made from dissolving pulp. The cellulose may be present in the form of a pulp, which may be chemical pulp, mechanical pulp, thermomechanical pulp or chemi(thermo)mechanical pulp (CMP or CTMP). Said chemical pulp is preferably a sulphite pulp or a kraft pulp.

The pulp may consist of pulp from hardwood, softwood or both types. The pulp may e.g. contain a mixture of pine and spruce or a mixture of birch and spruce. The chemical pulps that may be used in the present invention include all types of chemical wood-based pulps, such as bleached, half-bleached and unbleached sulphite, kraft and soda pulps, and mixtures of these. The pulp may be of dissolved type. The pulp may also comprise textile fibers. The pulp may also come from agriculture (e.g. potato, bamboo or carrot).

It is intended throughout the present description that the expression "free sugar" embraces not only sugars in monomeric forms but also smaller polymers. It embraces also free carbohydrates.

It has been shown that by subjecting a slurry comprising cellulose, such as microfibrillated cellulose fibers to an electric field the purification such as salt/ion depletion and/or free sugar depletion, preferably by using dewatering can strongly be improved. One theory of why it works so well, is that the electric field induces the liquids of the slurry to flow and thus pulls the water molecules away from the microfibrillated cellulose fibers instead of pushing the microfibrillated fibers as a mechanical treatment will do. Pulling the water molecules will make it possible to also remove water molecules being absorbed by the microfibrillated fibers in a very efficient way. It is thus very easy to purify the cellulose fibers of the slurry.

It has been shown that by purifying, such as salt/ion depletion and/or free sugar depletion, preferably by using dewatering, a slurry comprising cellulose, such as microfibrillated cellulose, by subjecting the slurry to an electric field, no substantial hornification of the microfibrillated fibers will occur. It is thus possible for the microfibrillated cellulose obtained according to the process of the first aspect to swell when the microfibrillated cellulose is in contact with water again. This is of great importance when the microfibrillated cellulose for example is used as a strength additive, a thickener or as a viscosity modifier. Furthermore, the bonding ability of the dewatered microfibrillated cellulose is also very good, i.e. no substantial decrease in bonding ability is seen.

When it comes to salt/ion depletion this effect may be due to the fact that the voltage gradient induces a migration of the different ions with the filtrate. This leads to a decrease in the specific conductivity of the product and a decrease in the conductivity of the sample.

Preferred embodiments of the first aspect of the invention are apparent from the dependent claims and the subject matter thereof is further set out below.

The dewatering is preferably done by the use of electro-osmosis. Electro-osmotic flow is often abbreviated EOF which is synonymous with electro-osmosis or electro-endosmosis. FFF is also one further electro-osmosis process. Electro-osmosis is the motion of liquid, such as water, induced by an applied potential or electric field across a porous material, capillary tube, membrane, microchannel, or any other fluid conduit. The voltage generated by the electric field is preferably between 10-100 V.

The liquid containing ion/salt and or free sugars of the slurry are separated from the cellulose, such as microfibrillated cellulose, by removing the liquid. It can preferably be done by different filtering techniques.

The slurry comprises cellulose, such as microfibrillated cellulose, and a liquid. The liquid may be water, a solvent and mixtures of different solvents and/or liquids. The solvent may be an alcohol, such as isopropanol, polyethylene glycol, glycol or ethanol. It can also be an acid or base. Solvents, such as isopropanol, can change the surface tension of the slurry and this will promote dewatering. The solvent may also be a solvent having at least one ketone group, and this may preferably be acetone. It is also possible that the liquid is an ionic liquid. The slurry may also comprise nanoparticles, polymers, pigments, salts and/or surfactants which are stimulated by the electric field and will improve the liquid migration and movement, i.e. the flow, in the electric field and thus also the dewatering.

According to a further preferred embodiment of the present invention the washing liquid is water and/or an organic solvent. The organic solvent is preferably acetone. In case drying is desirable as a follow-up of the process according to the first aspect as set out earlier, water (most preferred distilled water) is preferred as washing liquid in case of the cellulose being MFC, NCC, NFC or other cellulose derivative in a more efficient way (solvents should there be avoided) to avoid hornification.

The slurry may also as set out above comprise fibers of regular length. It is also possible that the slurry comprises fillers, such as nanoclays, polymeric based absorbents, PCC, kaolin or calcium carbonate. The amounts of microfibrillated cellulose in the slurry may be between 20-90% by weight, the amount of regular sized fibers such as kraft, hardwood and/or softwood fibers may be 10-80% by weight. If larger amounts of fillers and longer fibers are present in the slurry it is possible to achieve a slurry with very high dry content by using the dewatering process according to the invention. A dry content of up to 90% by weight is possible to achieve since the present of long fibers and/or fillers will make it easier to dewater the slurry.

It is however, preferred to use a slurry comprising high amounts of microfibrillated cellulose. A slurry comprising microfibrillated cellulose in an amount of 80-100% by weight, or 80-90% by weight, is often preferred. In many cases it is preferred that the slurry comprises 100% of microfibrillated cellulose, i.e. no fibers of longer size is present. The amount of microfibrillated cellulose depends on the end use of the microfibrillated cellulose.

It may also be advantageous to subject the slurry to increased pressure in combination with the electric field. It has been shown that the combination of electric field and pressure will strongly improve the purification, preferably by using dewatering, of a slurry comprising cellulose, such as microfibrillated cellulose. It is preferred to apply the pressure after the dewatering with the electric field has started, i.e. when the solid content of the slurry has increased, preferably to about 4% by weight. If the solid content of the slurry is too low when the pressure is applied, the microfibrillated cellulose is pressed through the openings of the dewatering device together with the water and no purification (such as salt/ion depletion and/or free sugar depletion) of the microfibrillated cellulose will occur. When the solid content of the slurry is increased, the viscosity is also increased and it is possible to apply pressure to the slurry and be able to increase the dewatering of the slurry.

The pressure is preferably a mechanical pressure being applied in any possible way. It possible to use, for example a roll nip, belt or felts for applying the mechanical pressure to the slurry during dewatering. It is also possible to combine the treatment with the electric field with other kind of treatments in order to increase the dewatering. Examples of other treatments besides increasing the pressure are acoustic and vacuum based systems.

The dry content of the slurry comprising cellulose, such as microfibrillated cellulose, before purifying, such as salt/ion depletion and/or free sugar depletion, preferably by using dewatering, is about 1-50% by weight. It may also have about 1-30% by weight or about 1-10% by weight.

After the treatment according to the process of the first aspect it is preferred that the dry content of the dewatered slurry comprising cellulose, such as microfibrillated cellulose, is about 5-50% by weight, more preferably above 20% by weight. It is thus possible to receive a slurry comprising microfibrillated cellulose with very high dry content in a very energy efficient way. Even though the dry content is increased the properties of the microfibrillated cellulose after dilution of water is maintained, e.g. the water swelling properties and strength.

The temperature of the slurry may be below 30° C. before dewatering and increased during the dewatering process but kept at a temperature below 100° C. However, lower temperatures, for example room temperatures are also possible. The temperature should preferably be kept below boiling point. Increased temperature may improve the dewatering. This is due to that that the viscosity of water is decreased.

The present invention also relates to cellulose, such as microfibrillated cellulose, being purified according to the process of the first aspect above. It has been shown that by purifying, such as salt/ion deplete and/or free sugar deplete, preferably by using dewatering, a slurry comprising cellulose, such as microfibrillated cellulose, by the aid of an electric field, no or very limited hornification of the microfibrillated cellulosic fibers will occur. It is thus possible to produce a microfibrillated cellulose with improved properties in a fast and very energy efficient way compared to the use of for example drying techniques.

A microfibrillated cellulose fiber is normally very thin (~20 nm) and the length is often between 100 nm to 10 µm. However, the microfibrils may also be longer, for example between 10-200 µm, but lengths even 2000 µm can be found due to wide length distribution. Fibers that has been fibrillated and which have microfibrils on the surface and microfibrils that are separated and located in a water phase of a slurry are included in the definition MFC. Furthermore, whiskers are also included in the definition MFC.

The microfibrillated cellulose is typically made from wood cellulose fibers, it is possible to use both hardwood and softwood fibers. It can also be made from microbial sources, agricultural fibers, such as wheat straw pulp or other non-wood fiber sources. It can also be produced by bacteria or made from CMC.

Using this electric field set out in the first aspect of the invention, in addition also reduces the number of bacteria as their cell walls will blow up. The process of the first aspect, as it removes ions, also removes ions and water also from microbes. This means that this ion removal and water removal will kill/antimicrobial effect.

According to a further preferred embodiment of the present invention the process according to the first aspect of the invention may be followed by one or more modification steps, such as a counter-ion change as set out below.

According to a further preferred embodiment of the present invention the cellulose according to the second and the third aspect may further be processed by using ion exchange e.g. as disclosed in WO2009126106 which discloses a method for modifying cellulose fibers. It would be possible to change cellulose to different counter-ion forms to get e.g. CMC adsorbed/absorbed into fibres. Thus it would e.g. be possible to have a sodium counter ion modification to enhance MFC production. It would also be possible to e.g. go from Ca-form to Na-form and vice versa.

According to a further preferred embodiment of the present invention counter-ion change, which preferably follows after the process steps of the first aspect, may be performed through a process comprising the following steps:
1) washing ions away from the pulp with electro osmosis (until the filtrate conductivity is low enough)—optionally followed by addition of liquid, preferably distilled water,
2) washing the "clean" pulp with a sodium carbonate such as NaHCO3 and a basic agent, such as NaOH (to increase the pH to about 9)—preferably this may be done by adding NaHCO3 and NaOH into the washing liquid of the electro-osmosis apparatus
3) washing the pulp with distilled water in the electro-osmosis apparatus to remove excess Na-ions.

Changing of the counter-ions as set out above could be desirable in several applications;
to make pulp more homogenous for chemical reactions,
for enabling different chemical reactions,
for improved reactivity of the pulp,
for improved drying or
for improved re-dispergativity of the one's dried pulp.

In barrier applications, which may be multi-layered, as set out in the fourth aspect of the present invention the use of the cellulose according to the second and third aspect may be especially desirable in packaging of electronic equipment, or when making solar cells or batteries from cellulose, due to purity.

The purified cellulose according to the second and third aspect can be present as low metal pulps. As such they may be useful for low conductivity paper (due to di-electrical properties), enzyme treatments of pulps or as pulp for chemical modifications.

The purified cellulose according to the second and third aspect in the form of microfibrillated cellulose may be especially useful in the following applications/uses:
barriers due to improved film forming properties washing powders due to improved $Ca^{2+}$ removal (absorbs/adsorps) or in other similar applications where hard water is a problem cleaning drinking water as it is possible to achieve improved heavy metal removal from drinking waters (this is still a large problem in some areas of word)

by oxidation and different additives one can improve metal absorption properties metal absorbents which are biodegradable Preferred features of each aspect of the invention are as for each of the other aspects mutatis mutandis. The prior art documents mentioned herein are incorporated to the fullest extent permitted by law. The invention is further described in the following examples, together with the appended figures, the only purpose of which is to illustrate the invention and are in no way intended to limit the scope of the invention in any way.

FIGURES

FIG. 1 discloses the dewatering setup scheme (left) and cathode plate with holes.

Figure 2:
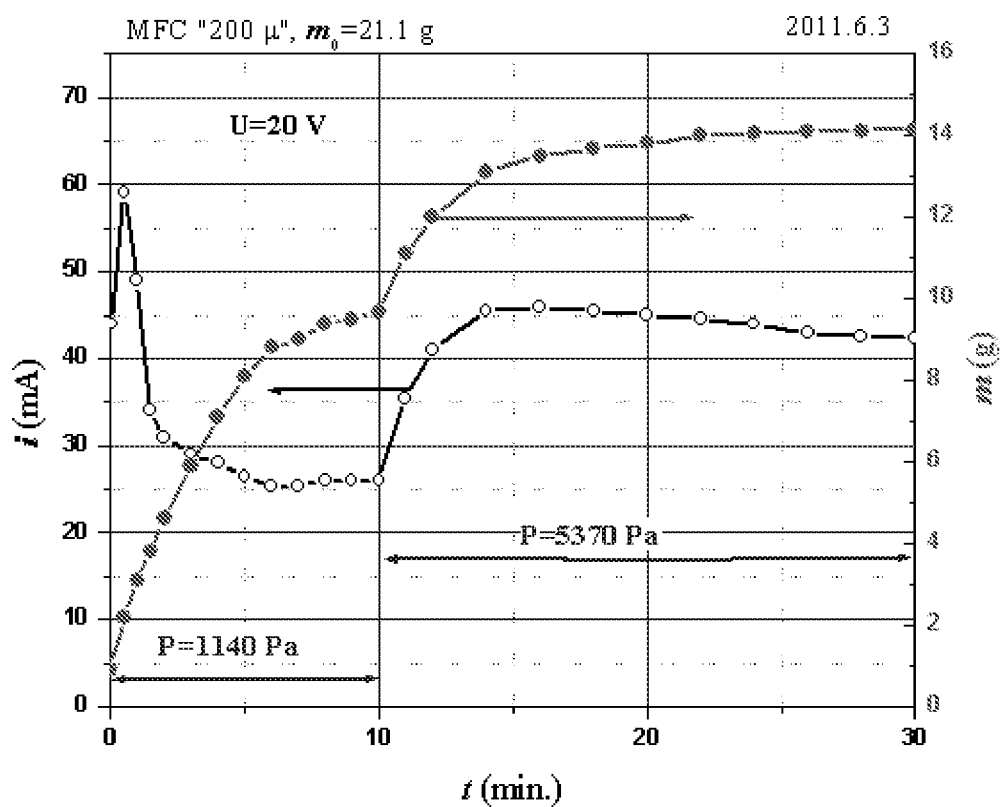

FIG. 2 discloses dependencies of current and mass of collected water on time at constant applied voltage 20 V.

Figure 3:
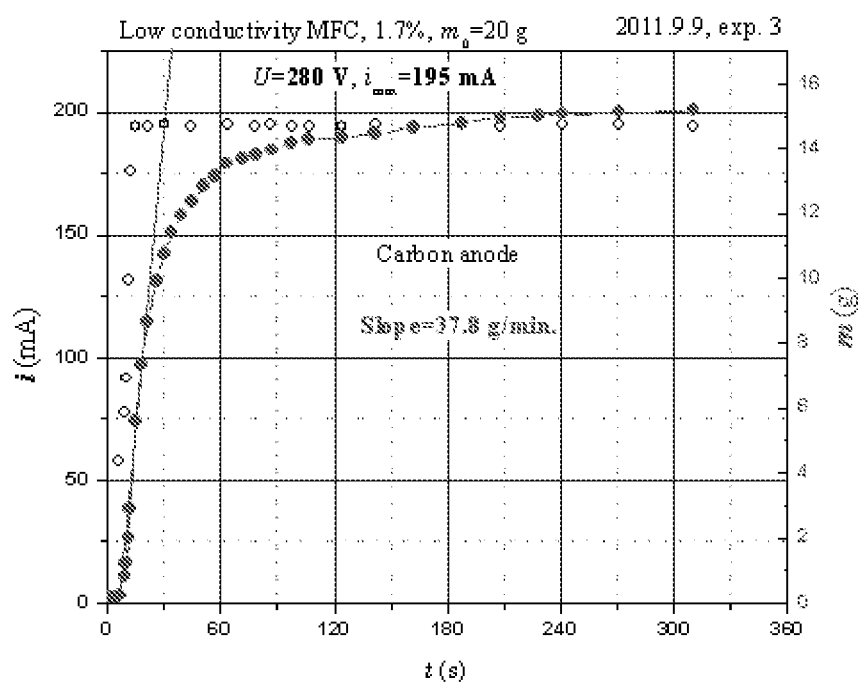

FIG. 3 discloses dewatering of low conductivity MFC.

Figure 4:
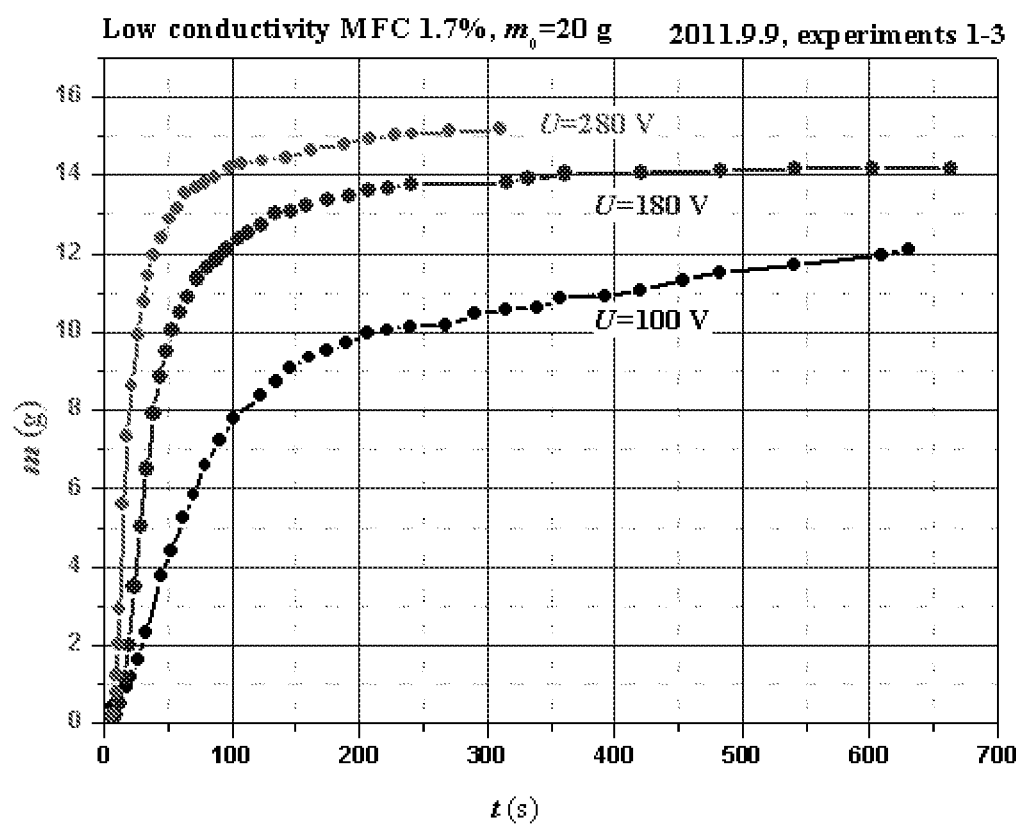

FIG. 4 discloses time dependencies of the water mass collected during dewatering of low conductivity MFC at different voltages are presented.

EXAMPLES

1. Experimental Set-Up

For investigation of MFC dispersion dewatering an experimental setup was assembled, scheme of which is on FIG. 1. It consists of a plastic pipe with internal diameter 46 mm, fitted into a stainless steel funnel. At the lower end of the pipe there is a plate with holes, also made of stainless steel, which serves as the lower electrode, usually cathode. A paper filter is placed on the plate, the MFC dispersion is loaded onto the filter. On top or the MFC column there is one more paper filter, after this the upper electrode (anode) is placed.

The best results were achieved with platinum electrode—no process changes due to the electrode corrosion or contamination were observed.

The setup of FIG. 1 constituted a cell with MFC investigated; DC voltage was applied into it from the current source. The water, emerging from the funnel was assembled into beaker, which was situated on top of a balance; the mass of the water extracted from MFC was registered during experiments. The experiments usually were carried out in two modes: with a voltage U constant or with current i constant.

Dependencies of current and mass of collected water on time at constant applied voltage 20 V is disclosed in FIG. 2. An increase of pressure causes an increase both of current and increment of collected water.

Surprisingly it was thus found that electro-osmosis dewatering may be used if;
in the beginning (more or less) only electro-osmosis is used
due to dewatering the viscosity will increase enough—that mechanical pressure may be applied (as reflected in FIG. 2)

FIG. 3 discloses dewatering of low conductivity MFC.

FIG. 4 discloses time dependencies of the water mass collected during dewatering of low conductivity MFC at different voltages are presented. The voltage increase causes an increase of dewatering speed (initial slope) and process saturation value.

Example 2

Reference MFC (initial MFC)—dry content (IR) 1.7%
Salt/Metal contents based on dry matter;
Al 9.5 mg/g
Fe 16 mg/g
Ca 1200 mg/kg
Cu 5.5 mg/kg
K 310 mg/kg
Mg 210 mg/kg
Mn 1.1 mg/kg
Na 1400 mg/kg
Ni 1.6 mg/kg
Pb 1.1 mg/kg
Si 76 mg/kg
Zn 5.9 mg/kg Dewatering Procedure 1—Only Removing Water;
A paper filter was places on cathode then MFC and then a second paper filter. After this the anode was laid on the top of this. The pressure (of weight of anode) was 750 kPa. After short time (2 min) an additional weight was added (pressure to 2400 Pa). The voltage during dewatering was 100V and time 640 s.
Procedure was repeated 3 times and pressure was increased (last time $4.6*10^5$ Pa).
Dewatered MFC (electro-osmosis MFC)—results are given below:
Salt/Metal contents based on dry matter 30.5%
Al 8.5 mg/kg
Fe 11 mg/kg
Ca 30 mg/kg
Cu 0.69 mg/kg
K 85 mg/kg
Mg 5.7 mg/kg
Mn 0.24 mg/kg
Na 12 mg/kg
Ni 0.68 mg/kg
Pb <0.4 mg/kg
Si 13 mg/kg
Zn 1.5 mg/kg Example 3

Reference MFC (initial MFC)—dry content (IR) 1.7%
Salt/Metal contents based on dry matter;
Al 9.5 mg/g
Fe 16 mg/g
Ca 1200 mg/kg
Cu 5.5 mg/kg
K 310 mg/kg
Mg 210 mg/kg
Mn 1.1 mg/kg
Na 1400 mg/kg
Ni 1.6 mg/kg
Pb 1.1 mg/kg
Si 76 mg/kg
Zn 5.9 mg/kg Dewatering Procedure 2—Removing Water and Washing with Acetone
MFC was dewatered 5 min (as in procedure 1 above i.e. Example 2). After this the current was switched off and acetone was added (about the same amount as water was removed in previous step). After this dewatering was started and continued about 10 min.
Dewatered MFC (electro-osmosis MFC with acetone)—results given below:
Salt/Metal contents based on dry matter 23.5%
Al 4.6 mg/kg
Fe 10 mg/kg
Ca 10 mg/kg
Cu 0.68 mg/kg
K 40 mg/kg
Mg 7.1 mg/kg
Mn 0.13 mg/kg
Na 14 mg/kg
Ni 0.50 mg/kg
Pb <0.4 mg/kg
Si 13 mg/kg
Zn 1.5 mg/kg Example 4

Temperature Test

Using the same set up as out above, temperature tests were performed.
Temperature 90-95° C.—dewatering in 60 s=about 16 g water
Temperature 21° C.—dewatering in 60 s=about 13.5 g water
Accordingly it was beneficial to use higher temperature to improve dewatering. Thus the energy needed for dewatering is much lower at elevated temperatures.

Example 5

A further trial was done where even more ions (especially $Ca^{2+}$ ions) were removed.
In the start the total amount was 20 g of wet MFC.
1) about 11 g of water was removed with electro-osmosis
  a. metal content of the water
    i. Ca 14 mg/l
    ii. K 2.7 mg/l
    iii. Na 26 mg/l
    iv. Si 1.3 mg/l
2) about 10 g of distilled water was added
3) about 10 g of water was removed
  a. metal content of the water
    i. Ca 8 mg/l
    ii. K 0.56 mg/l
    iii. Na 0.78 mg/l
    iv. Si 0.22 mg/l
4) about 10 g of distilled water was added
5) about 9 g of water was removed
  a. metal content of the water
    i. Ca 7.4 mg/l
    ii. K 0.56 mg/l
    iii. Na 0 mg/l (below detection limit)
    iv. Si 0.076 mg/l
6) distilled water (as reference)
  a. metal content of the water
    i. Ca 0.079 mg/l
    ii. K 0 (below detection limit)
    iii. Na 0 (below detection limit)
    iv. Si 0 (below detection limit)
In view of the above detailed description of the present invention, other modifications and variations will become apparent to those skilled in the art. However, it should be apparent that such other modifications and variations may be effected without departing from the spirit and scope of the invention.

The invention claimed is:

1. A process for purifying by salt/ion depletion or free sugar depletion a slurry comprising microfibrillated cellulose, wherein the process comprises the following steps:
   a) providing a slurry comprising at least 20% microfibrillated cellulose by solids weight and a liquid,
   b) subjecting the slurry to a first application of an electric field inducing the liquid of the slurry to flow,
   c) separating the liquid from the microfibrillated cellulose thus obtaining a liquid depleted slurry,
   d) adding a washing liquid to the liquid depleted slurry,
   e) subjecting the liquid depleted slurry to a second application of an electric field inducing the washing liquid of the slurry to flow and
   f) separating the washing liquid from the microfibrillated cellulose, thus obtaining a purified microfibrillated cellulose.

2. The process according to claim 1 wherein the liquid separation is done by electro-osmosis.

3. The process according to claim 1 wherein the electric field has a voltage between 10-100 V.

4. The process according to claim 1 wherein pressure also is applied in order to separate the liquid from the microfibrillated cellulose.

5. The process according to claim 4 wherein the pressure is applied after the electric field has been applied and the dewatering has started.

6. The process according to claim 4 wherein the pressure is a mechanical pressure.

7. The process according to claim 1 wherein the dry content of the slurry before dewatering, salt/ion depletion or free sugar depletion, is 1-50% by weight.

8. The process according to claim 1 wherein the dry content of the dewatered slurry is 5-50% by weight.

9. The process according to claim 1 wherein the temperature of the slurry during dewatering is above 30° C. and below 100° C.

10. The process according to claim 1 wherein the slurry comprises one or more of the constituents selected from the group consisting of nanoparticles, absorbents, salt, free sugars and surfactants which are stimulated by the electric field.

11. The process according to claim 1 wherein the washing liquid is water, an organic solvent or a combination thereof.

12. The process according to claim 1 followed by a counter-ion change step.

13. The process according to claim 1 wherein the washing liquid is an organic solvent.

14. The process according to claim 1 further comprising at least one additional washing step.

15. A process for purifying a slurry comprising microfibrillated cellulose by salt/ion depletion or free sugar depletion, wherein the process comprises the following steps:
   providing a slurry comprising at least 20% microfibrillated cellulose by solids weight and a liquid,
   subjecting the slurry to a first application of an electric field inducing the liquid of the slurry to flow,
   applying pressure in combination with the electric field to the slurry after the first application of the electric field, the flow of the liquid has started and the solids of the slurry is at least about 4% by weight,
   separating the liquid from the microfibrillated cellulose thus obtaining a liquid depleted slurry,
   adding a washing liquid to the liquid depleted slurry,
   subjecting the liquid depleted slurry to another application of an electric field inducing the washing liquid of the slurry to flow, and
   separating the washing liquid from the microfibrillated cellulose, thus obtaining a purified microfibrillated cellulose.

* * * * *